US012767438B2

(12) United States Patent
Kawashima et al.

(10) Patent No.: US 12,767,438 B2
(45) Date of Patent: Oct. 20, 2026

(54) ARTICLE TRANSPORT FACILITY AND TRAVELING VEHICLE

(71) Applicant: DAIFUKU CO., LTD., Osaka (JP)

(72) Inventors: Tomohiko Kawashima, Shiga (JP); Yasunobu Matsuo, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 273 days.

(21) Appl. No.: 18/679,684

(22) Filed: May 31, 2024

(65) Prior Publication Data

US 2024/0409311 A1 Dec. 12, 2024

(30) Foreign Application Priority Data

Jun. 8, 2023 (JP) ................................ 2023-094983

(51) Int. Cl.
*B65G 1/04* (2006.01)

(52) U.S. Cl.
CPC .................................. *B65G 1/0407* (2013.01)

(58) Field of Classification Search
CPC .................................................... B65G 1/0407
See application file for complete search history.

(56) References Cited

U.S. PATENT DOCUMENTS

| | | | | |
|---|---|---|---|---|
| 3,402,836 A * | 9/1968 | Debrey | B65G 1/0421 360/79 |
| 6,003,771 A * | 12/1999 | Kusters | G06V 30/224 235/383 |
| 10,207,867 B2 * | 2/2019 | Brumm | B65G 1/02 |
| 2005/0047895 A1 | 3/2005 | Lert | |
| 2018/0327009 A1 | 11/2018 | Takagawa et al. | |

FOREIGN PATENT DOCUMENTS

| | | |
|---|---|---|
| CN | 213650782 U | 7/2021 |
| JP | 2009-165224 A | 7/2009 |
| JP | 2010-047335 A | 3/2010 |
| JP | 2015-087964 A | 5/2015 |
| JP | 2015189567 A | 11/2015 |
| JP | 2018-039655 A | 3/2018 |
| JP | 2018-190234 A | 11/2018 |

OTHER PUBLICATIONS

Office Action dated Jan. 6, 2026 issued in Japanese patent application No. 2023-094983.

* cited by examiner

*Primary Examiner* — Thomas C Diaz
(74) *Attorney, Agent, or Firm* — Harness, Dickey & Pierce, P.L.C.

(57) ABSTRACT

A risk of a deterioration in detection performance of an identifier is reduced. An article transport facility includes: a first rail; a second rail; and a first traveling vehicle that has a first wheel which rolls on an upper surface of the first rail, a first roller which rolls on a side surface of the first rail, and a second roller which rolls on an upper surface of the second rail, an identifier being provided on a side surface of the second rail, the identifier including position information that is information pertaining to a position in a longitudinal direction of the second rail, and the first traveling vehicle further having a first reader which reads the position information from the identifier.

7 Claims, 10 Drawing Sheets

ARTICLE TRANSPORT FACILITY AND TRAVELING VEHICLE

This Nonprovisional application claims priority under 35 U.S.C. § 119 on Patent Application No. 2023-094983 filed in Japan on Jun. 8, 2023, the entire contents of which are hereby incorporated by reference.

TECHNICAL FIELD

The present invention relates to an article transport facility and a traveling vehicle.

BACKGROUND ART

A stacker crane that travels along a guide rail so as to transport an article is conventionally known. The stacker crane includes a traveling vehicle that has a wheel, and travels on a traveling rail by driving of the wheel of the traveling vehicle. An accurate position of the traveling vehicle on the traveling rail is sensed by reading information from a bar code or the like.

For example, Patent Literature 1 discloses an automatic warehouse that includes a stacker crane. In the automatic warehouse, a beam is provided so as to be parallel to an upper rail that is located in a ceiling part and that guides a guide roller. A detection target, which is, for example, a dog or a bar code for controlling traveling of the stacker crane, is attached to the beam. Traveling of the stacker crane is controlled on the basis of a detection result from the detection target.

CITATION LIST

Patent Literature

[Patent Literature 1]
Japanese Patent Application Publication, Tokukai, No. 2015-189567

SUMMARY OF INVENTION

Technical Problem

In the automatic warehouse of Patent Literature 1, it is necessary to provide, separately from the upper rail, the beam to which the detection target is to be attached. In order to reduce the number of components, it is considered that an identifier for controlling traveling of a stacker crane is provided on a traveling rail on which a traveling vehicle of the stacker crane travels. However, it is considered that, in a case where an identifier is provided on a traveling rail on which a traveling vehicle travels, the identifier is worn by a roller which rolls on the traveling rail, or dust, etc. from the roller is deposited on the identifier. Thus, there is a risk of a deterioration in detection performance of the identifier.

An object of an aspect of the present invention is to reduce a risk of a deterioration in detection performance of an identifier.

Solution to Problem

In order to attain the object, an article transport facility in accordance with an aspect of the present invention includes: a first rail; a second rail that is installed in parallel with the first rail; and a first traveling vehicle that has a first wheel which rolls on an upper surface of the first rail, a first roller which rolls on a side surface of the first rail, and a second roller which rolls on an upper surface of the second rail, an identifier being provided on a side surface of the second rail, the identifier including position information that is information pertaining to a position in a longitudinal direction of the second rail, and the first traveling vehicle further having a first reader which reads the position information from the identifier.

In order to attain the object, a traveling vehicle in accordance with an aspect of the present invention includes: a wheel that rolls on an upper surface of a first rail; a first roller that rolls on a side surface of the first rail; a second roller that rolls on an upper surface of a second rail which is installed in parallel with the first rail; and a reader that reads, from an identifier which is provided on a side surface of the second rail, position information which is information pertaining to a position in a longitudinal direction of the second rail.

Advantageous Effects of Invention

An aspect of the present invention makes it possible to reduce a risk of a deterioration in detection performance of an identifier.

DESCRIPTION OF EMBODIMENTS

Embodiment 1

The following will describe an embodiment of the present invention in detail with reference to FIGS. 1 to 8.

Article Transport Facility

Figure 1:
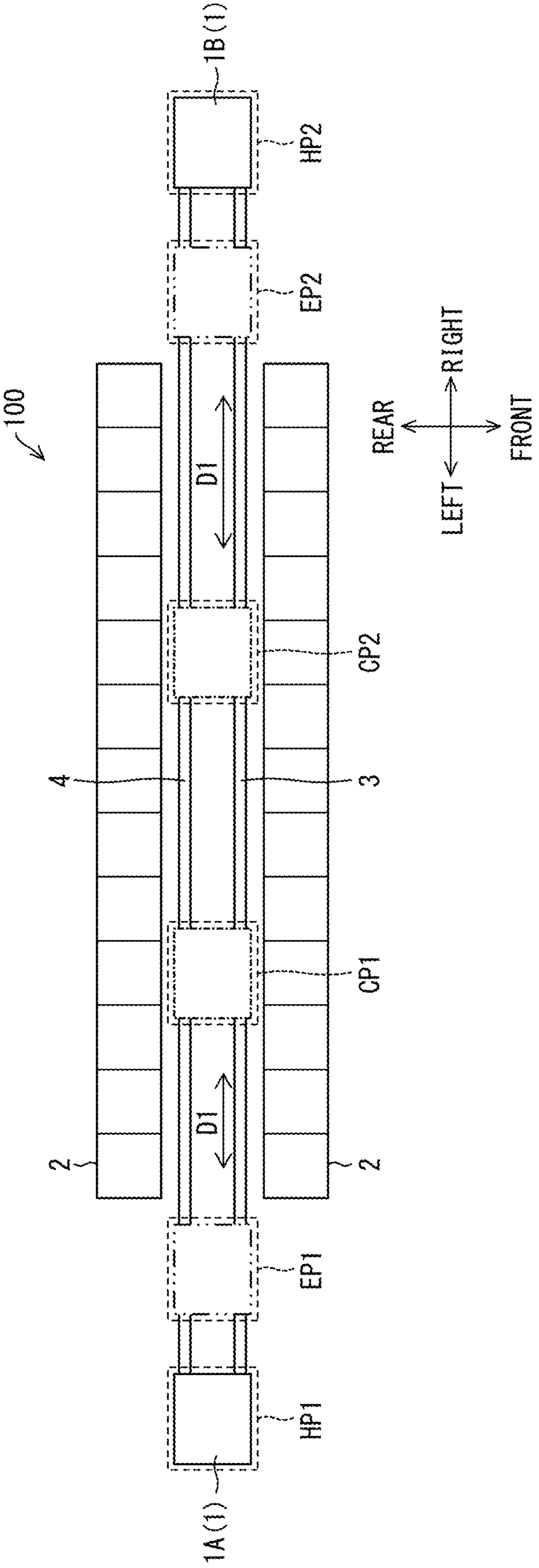
FIG. 1 is a view schematically illustrating an example of an article transport facility in accordance with Embodiment 1 of the present invention.

An overview of an article transport facility 100 will be described with reference to FIG. 1. FIG. 1 is a view schematically illustrating an example of the article transport facility 100. For convenience of description, an up-down direction, a front-rear direction, and a right-left direction are defined as indicated by arrows in FIG. 1, etc. Note that, in the present embodiment, the up-down direction is a direction orthogonal to the front-rear direction and the right-left direction, and the front-rear direction is a direction orthogonal to the right-left direction.

The article transport facility 100 illustrated in FIG. 1 includes a stacker crane 1, load shelves 2, a traveling guide rail 3, and a traveling rail 4. The load shelves 2 are each a shelf on which an article can be placed. The load shelves 2 are each provided with a plurality of stages in the up-down direction, and a space for placing an article is partitioned in the right-left direction of each of the stages. The traveling guide rail 3 and the traveling rail 4 that constitute a traveling path of the stacker crane 1 are installed on a floor between a front load shelf 2 and a rear load shelf 2, and the stacker crane 1 is capable of traveling in a space between the front load shelf 2 and the rear load shelf 2. The traveling guide rail 3 is an example of a first rail. The traveling rail 4 is installed in parallel with the traveling guide rail 3. In the present embodiment, the traveling rail 4 is an example of a second rail. A longitudinal direction of each of the traveling guide rail 3 and the traveling rail 4 is the right-left direction.

The stacker crane 1 is a device for transporting an article. The height of the stacker crane 1 in the up-down direction is about 2 m to 18 m. The stacker crane 1 travels along the traveling guide rail 3. In the present embodiment, a traveling direction D1 of the stacker crane 1 is the right-left direction. In the article transport facility 100, a plurality of stacker cranes 1 travel on a single traveling guide rail 3 and a single traveling rail 4. Note that the article transport facility 100 may be configured such that one stacker crane 1 travels on the traveling guide rail 3 and the traveling rail 4.

In the following description, the stacker crane 1 illustrated in a left-hand part of FIG. 1 is referred to as a stacker crane 1A, and the stacker crane 1 illustrated in a right-hand part of FIG. 1 is referred to as a stacker crane 1B.

In a case where the stacker cranes 1A and 1B are in a standby state in which no article is transported, the stacker cranes 1A and 1B are kept on standby at home positions HP1 and HP2, respectively. The home position HP1 of the stacker crane 1A is provided on the left side of the traveling guide rail 3, and the home position HP2 of the stacker crane 1B is provided on the right side of the traveling guide rail 3. A loading and unloading port EP1 through which an article is transferred to or from the stacker crane 1A is provided on the right side of the home position HP1. A loading and unloading port EP2 through which an article is transferred to or from the stacker crane 1B is provided on the left side of the home position HP2. Note that the home position HP1 and the loading and unloading port EP1 may be located at an identical position and that the home position HP2 and the loading and unloading port EP2 may be located at an identical position. A transport position CP1 is a position at which the stacker crane 1A can load or unload an article on or from the front load shelf 2 or the rear load shelf 2. A transport position CP2 is a position at which the stacker crane 1B can load or unload an article on or from the front load shelf 2 or the rear load shelf 2. The transport positions CP1 and CP2 vary in accordance with a position of the front or rear load shelf 2 on which an article to be loaded or unloaded is placed. The transport position CP1 of the stacker crane 1A is a position on the traveling guide rail 3 which position is more rightward than the loading and unloading port EP1. The transport position CP2 of the stacker crane 1B is a position on the traveling guide rail 3 which position is more leftward than the loading and unloading port EP2.

The stacker crane 1A moves to the home position HP1, the loading and unloading port EP1, or the transport position CP1 in accordance with a transport command signal. The stacker crane 1B moves to the home position HP2, the loading and unloading port EP2, or the transport position CP2 on the basis of the transport command signal. For example, in a case where the stacker crane 1A receives the transport command signal for loading an article in the fourth row from the left on the front load shelf 2, the stacker crane 1A receives the article from a loading conveyor at the loading and unloading port EP2 and then moves to the transport position CP1 illustrated in FIG. 1. Upon completion of loading of the article in the front load shelf 2 at the transport position CP1 illustrated in FIG. 1, the stacker crane 1A moves to the home position HP1, the loading and unloading port EP1, or the transport position CP1 in accordance with a subsequent transport command signal. In contrast, in a case where the stacker crane 1A receives the transport command signal for picking an article placed in the fourth row from the left on the front load shelf 2, the stacker crane 1A moves to the transport position CP1 illustrated in FIG. 1. Upon completion of picking of the article from the load shelf 2A at the transport position CP1 illustrated in FIG. 1, the stacker crane 1A moves to the loading and unloading port EP1 and transfers the article to an unloading conveyor at the loading and unloading port EP1. The stacker crane 1A moves to the home position HP1, the loading and unloading port EP1, or the transport position CP1 in accordance with a subsequent transport command signal.

The loading and unloading ports EP1 and EP2 are each located on an outside of the load shelves 2 in the traveling direction. Note, however, that the present invention is not limited to such a configuration. The loading and unloading ports EP1 and EP2 each may be located at a position that overlaps a corresponding one of the load shelves 2 in the traveling direction. That is, the loading and unloading ports EP1 and EP2 each may be provided to a corresponding one of the front and rear load shelves 2. In this case, openings through each of which an article can be transferred are formed in the load shelves 2 that are provided with the loading and unloading ports EP1 and EP2. For example, the stacker crane 1A stops in front of a row of the load shelf 2 that is provided with the loading and unloading port EP1. Further, the loading and unloading ports EP1 and EP2 are loading and unloading ports that are different from each other. Note, however, that the present invention is not limited to such a configuration. The loading and unloading port EP2 may be a loading and unloading port that is identical to the loading and unloading port EP1.

Stacker Crane

Figure 2:
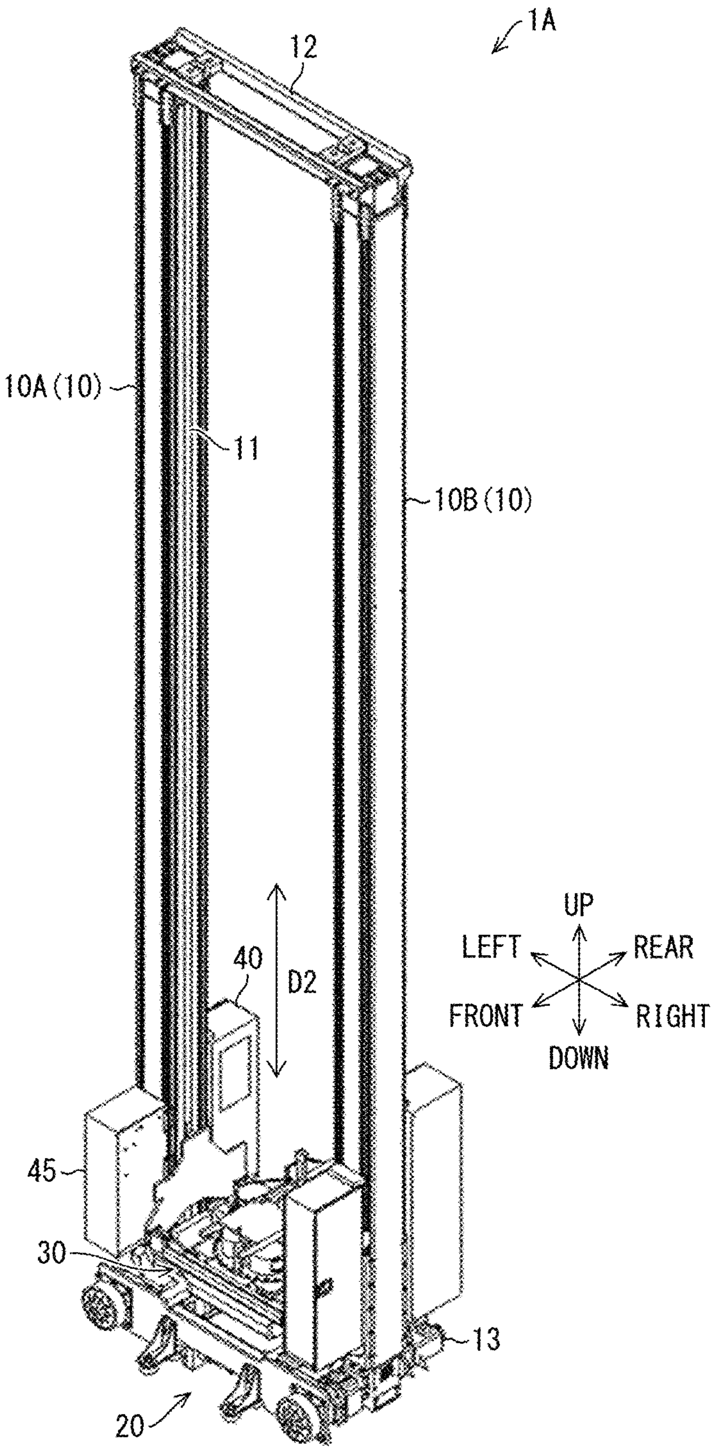
FIG. 2 is a perspective view of a stacker crane illustrated in FIG. 1.

Next, a detailed configuration of the stacker crane 1A will be described with reference to FIGS. 2 to 7. FIG. 2 is a perspective view illustrating the stacker crane 1A illustrated in FIG. 1. As illustrated in FIG. 2, the stacker crane 1A includes a mast 10, a traveling vehicle 20, a raising and lowering platform 30, a control box 40, and a driver box 45.

Mast

The mast 10 is a columnar member that extends in the up-down direction. The stacker crane 1A is provided with a pair of masts 10. Note that, in the following description, the mast 10 illustrated in the left-hand part of the drawing (the mast 10 on the home position HP1 side) is referred to as a first mast 10A, and the mast 10 illustrated in the right-hand part of the drawing (the mast 10 on the transport position CP1 side) is referred to as a second mast 10B.

The first mast 10A and the second mast 10B are spaced apart from each other in the right-left direction. The raising and lowering platform 30 (described later) is provided between the first mast 10A and the second mast 10B. The first mast 10A and the second mast 10B are provided with respective raising and lowering guide rails 11. The raising and lowering guide rails 11 guide the raising and lowering platform 30 in the up-down direction.

To upper parts of the masts 10, an upper frame 12 is provided. The upper frame 12 is provided so as to connect an upper end portion of the first mast 10A and an upper end portion of the second mast 10B. The upper frame 12 is engaged with an upper rail (not illustrated) that is provided so as to be parallel to the traveling guide rail 3. Further, the upper frame 12 is provided with a guide roller(s), and the upper parts of the masts 10 are guided along the upper rail by the guide roller(s) of the upper frame 12. That is, the upper end portions of the masts 10 are guided in the traveling direction D1 by the upper rail. Note that the stacker crane 1A may be configured not to have the upper frame 12.

Raising and lowering motors 13, which are driving sections for raising and lowering the raising and lowering platform 30 with respect to the masts 10, are provided to lower parts of the respective pair of masts 10. The raising and lowering motors 13 are provided on a rear side of the masts 10, that is, on the traveling rail 4 side with respect to the masts 10.

The raising and lowering motors 13 drive driving drums (not illustrated) that are provided to the lower parts of the respective masts 10. In a case where the raising and lowering motors 13 rotate forward or backward, raising and lowering belts (not illustrated) wound on the respective driving drums advance or retract with respect to the driving drums. Pulleys for locking the raising and lowering belts are provided to the upper parts of the respective pair of masts 10. The raising and lowering platform 30 is fixed to one end of a raising and lowering belt, and a counterweight is fixed to the other end of the raising and lowering belt. Advance or retraction of the raising and lowering belts moves the raising and lowering platform 30 in the up-down direction along the raising and lowering guide rails 11. That is, the raising and lowering platform 30 is raised and lowered with respect to the masts 10 in a raising and lowering direction D2 by driving of the raising and lowering motors 13. Note that the raising and lowering platform 30 may be configured to be raised and lowered with respect to the masts 10 by raising and lowering wires or raising and lowering chains in place of the raising and lowering belts.

Traveling Vehicle

Figure 3:
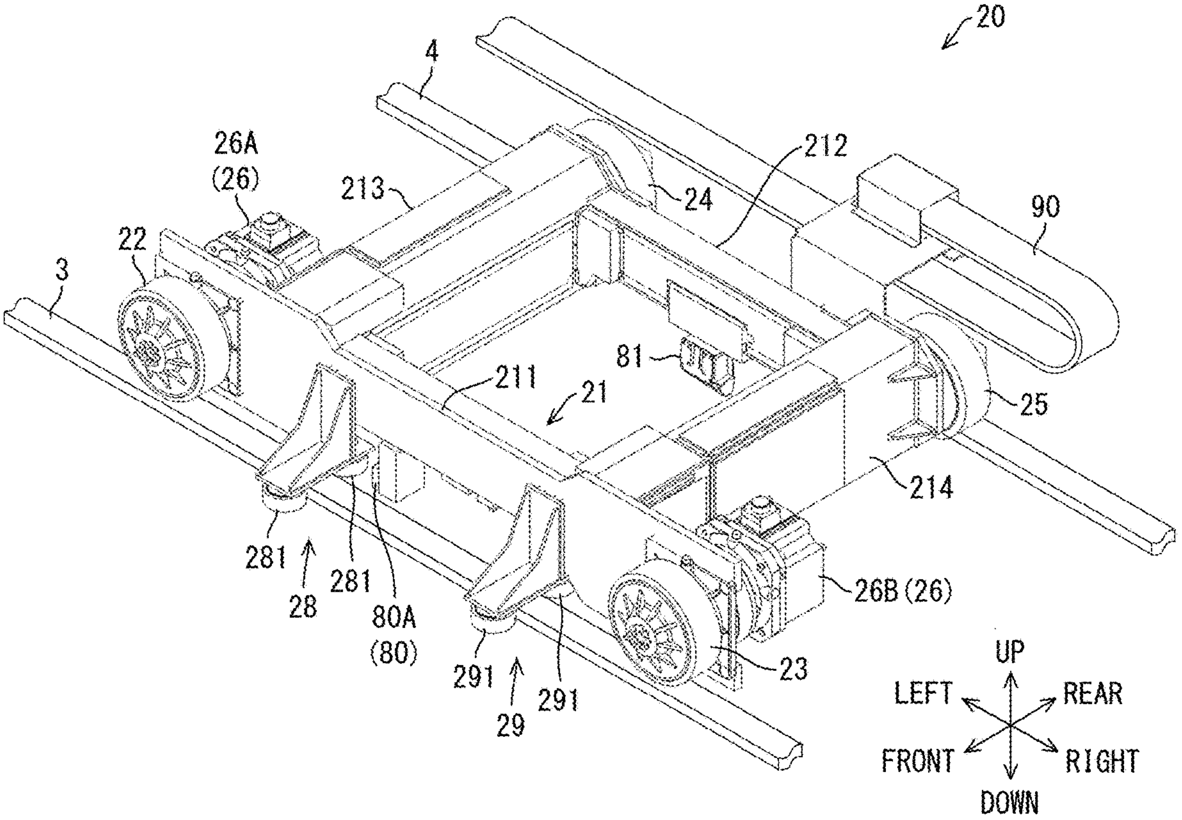
FIG. 3 is a perspective view of a traveling vehicle of the stacker crane illustrated in FIG. 2.
Figure 4:
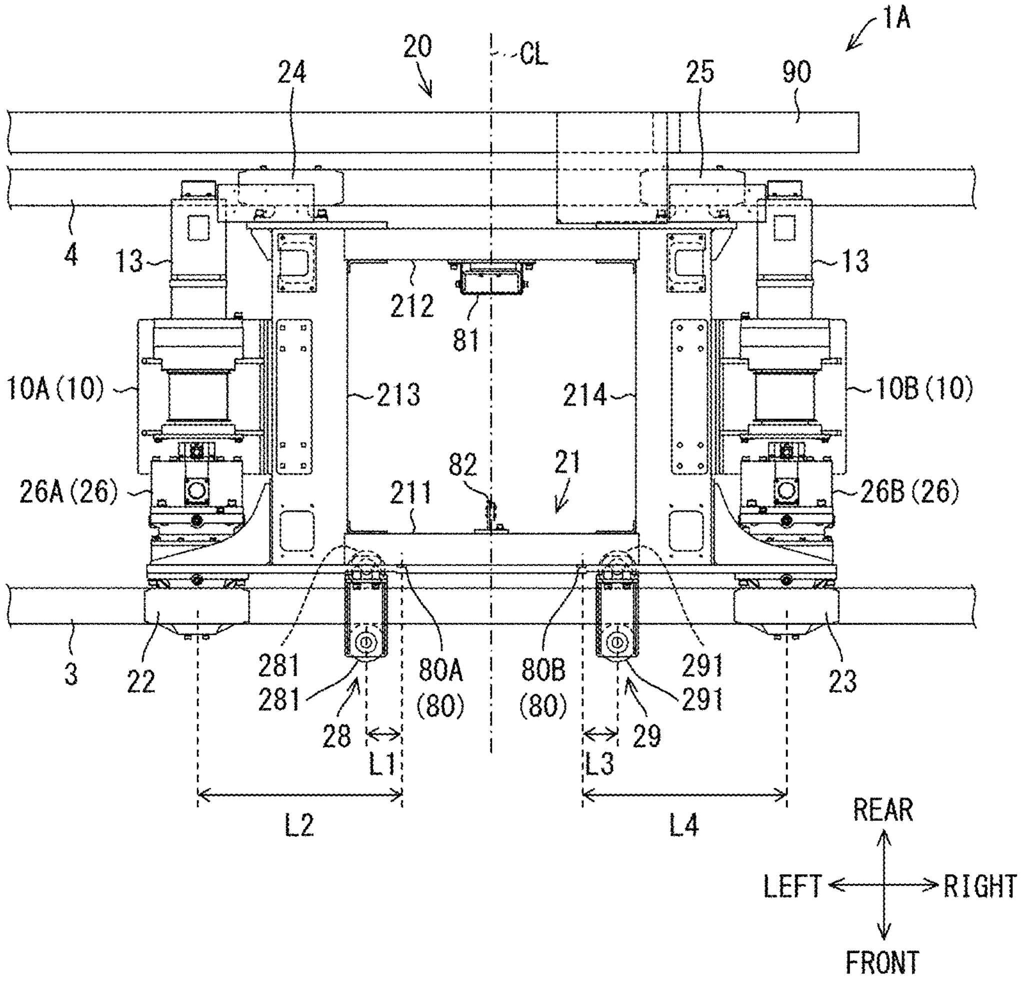
FIG. 4 is a plan view of the traveling vehicle of the stacker crane illustrated in FIG. 2, as viewed from above.

Next, a detailed configuration of the traveling vehicle 20 will be described with reference to FIGS. 3 and 4. FIG. 3 is a perspective view of the traveling vehicle 20 of the stacker crane 1A illustrated in FIG. 2. FIG. 4 is a plan view of the traveling vehicle 20 of the stacker crane 1A illustrated in FIG. 2, as viewed from above. As illustrated in FIGS. 3 and 4, the traveling vehicle 20 has a vehicle frame 21. The traveling vehicle 20 of the stacker crane 1A is an example of a first traveling vehicle. The vehicle frame 21 is constituted by a first side frame 211, a second side frame 212, a first connection frame 213, and a second connection frame 214. In the present embodiment, the first side frame 211, the second side frame 212, the first connection frame 213, and the second connection frame 214 are integrally formed.

Note that the frames 211 to 214 constituting the vehicle frame 21 are not limited to those integrally formed and may be separate members. In this case, a left end portion of the first connection frame 213 and a left end portion of the second connection frame 214 are fixed to the first connection frame 213 by a bolt or the like. Further, a right end portion of the first connection frame 213 and a right end portion of the second connection frame 214 are fixed to the second connection frame 214 by a bolt or the like. In a case where the frames 211 to 214 are separate members, the stacker crane 1 that has a large size can be delivered in a disassembled state. Thus, the stacker crane 1 can be transported in a compact manner while being delivered.

As illustrated in FIG. 3, the first side frame 211 is a frame that is located in a front part of the traveling vehicle 20, and extends in a direction along the traveling guide rail 3 and the traveling rail 4. That is, the first side frame 211 is a frame in which the right-left direction, which is the traveling direction D1, is the longitudinal direction. The second side frame 212 is a frame that is located in a rear part of the traveling vehicle 20, and extends in the direction along the traveling guide rail 3 and the traveling rail 4. That is, the second side frame 212 is a frame in which the right-left direction is the longitudinal direction. As illustrated in FIG. 4, the second side frame 212 faces the first side frame 211 in the front-rear direction. A length of the second side frame 212 in the right-left direction is shorter than a length of the first side frame 211 in the right-left direction.

As illustrated in FIG. 3, the first connection frame 213 is a frame that connects the first side frame 211 and the second side frame 212, and is located on the left side with respect to the traveling vehicle 20. More specifically, the first connection frame 213 connects a left end portion of the first side frame 211 and a left end portion of the second side frame 212. The first connection frame 213 is a frame in which the front-rear direction is the longitudinal direction. As illustrated in FIG. 4, the first mast 10A is erected on the first connection frame 213.

As illustrated in FIG. 3, the second connection frame 214 is a frame that connects the first side frame 211 and the second side frame 212, and is located on the right side with respect to the traveling vehicle 20. More specifically, the second connection frame 214 connects a right end portion of the first side frame 211 and a right end portion of the second side frame 212. The second connection frame 214 is a frame in which the front-rear direction is the longitudinal direction. The second connection frame 214 faces the first connection frame 213 in the right-left direction. As illustrated in FIG. 4, the second mast 10B is erected on the second connection frame 214.

As illustrated in FIG. 3, the traveling vehicle 20 has a plurality of wheels that travel on the traveling guide rail 3 and the traveling rail 4. More specifically, the traveling vehicle 20 has a first driving wheel 22, a second driving wheel 23, a first driven wheel 24, and a second driven wheel 25.

The first driving wheel 22 and the second driving wheel 23 are attached to the first side frame 211 and roll on an upper surface of the traveling guide rail 3. The first driving wheel 22 and the second driving wheel 23 are examples of a first wheel. The first driving wheel 22 is disposed so as to be spaced apart from the second driving wheel 23 in the right-left direction. More specifically, the first driving wheel 22 is located on the left end portion side of the first side frame 211 when viewed from a central position CL in the right-left direction of the vehicle frame 21. The second driving wheel 23 is located on the right end portion side of the first side frame 211 when viewed from the central position CL. The first driving wheel 22 is located on the left side of the first connection frame 213 in the right-left direction. The second driving wheel 23 is located on the right side of the second connection frame 214 in the right-left direction.

The first driven wheel 24 and the second driven wheel 25 are attached to the second side frame 212 and roll on an upper surface of the traveling rail 4. In the present embodiment, the first driven wheel 24 and the second driven wheel 25 are examples of a second roller. The first driven wheel 24 is disposed so as to be spaced apart from the second driven wheel 25 in the right-left direction. More specifically, the first driven wheel 24 is located on the left end portion side of the second side frame 212 when viewed from the central position CL in the right-left direction of the vehicle frame 21. The second driven wheel 25 is located on the right end portion side of the second side frame 212 when viewed from the central position CL. The first driven wheel 24 is located on the right side of the first driving wheel 22 in the right-left direction. The second driven wheel 25 is located on the left side of the second driving wheel 23 in the right-left direction.

The vehicle frame 21 is provided with traveling motors 26 that are driving sections for causing the stacker crane 1A to travel. Note that, in the following description, the traveling motor 26 illustrated in the left-hand part of the drawing (the traveling motor 26 on the home position HP1 side) is referred to as a first traveling motor 26A, and the traveling motor 26 illustrated in the right-hand part of the drawing (the traveling motor 26 on the transport position CP1 side) is referred to as a second traveling motor 26B. The first traveling motor 26A is located on the left end portion side of the first side frame 211 and drives the first driving wheel 22. The second traveling motor 26B is located on the right end portion side of the first side frame 211 and drives the second driving wheel 23.

The traveling vehicle 20 has a first guide roller pair 28 and a second guide roller pair 29. The first guide roller pair 28 and the second guide roller pair 29 are attached to the first side frame 211. The second guide roller pair 29 is disposed so as to be spaced apart from the first guide roller pair 28 in the right-left direction. The first guide roller pair 28 is located on the left side in the right-left direction, and the second guide roller pair 29 is located on the right side in the right-left direction. That is, the first guide roller pair 28 is located closer to the first driving wheel 22 than the second guide roller pair 29 in the right-left direction. Further, the first guide roller pair 28 is located closer to the first driving wheel 22 than a second distance sensor 80B (described later) in the right-left direction. The first guide roller pair 28 and the second guide roller pair 29 are located between the first driving wheel 22 and the second driving wheel 23 in the right-left direction.

As illustrated in FIG. 4, when viewed from the central position CL in the right-left direction of the vehicle frame 21, the first guide roller pair 28 is located on the left side of the first side frame 211 and is located on the right side of the first connection frame 213. The first guide roller pair 28 is constituted by a pair of first guide rollers 281. The traveling guide rail 3 is sandwiched between the pair of first guide rollers 281 in the front-rear direction. More specifically, a front first guide roller 281 comes into contact with a front side surface of the traveling guide rail 3 and rolls on the front side surface of the traveling guide rail 3. A rear first guide roller 281 comes into contact with a rear side surface of the traveling guide rail 3 and rolls on the rear side surface of the traveling guide rail 3. A first guide roller 281 is an example of a first roller.

When viewed from the central position CL in the right-left direction of the vehicle frame 21, the second guide roller pair 29 is located on the right side of the first side frame 211 and is located on the left side of the second connection frame 214. The second guide roller pair 29 is constituted by a pair of second guide rollers 291. The traveling guide rail 3 is sandwiched between the pair of second guide rollers 291 in the front-rear direction. More specifically, a front second guide roller 291 comes into contact with the front side surface of the traveling guide rail 3 and rolls on the front side surface of the traveling guide rail 3. A rear second guide roller 291 comes into contact with the rear side surface of the traveling guide rail 3 and rolls on the rear side surface of the traveling guide rail 3. A second guide roller 291 is an example of the first roller.

The first guide rollers 281 of the first guide roller pair 28 and the second guide rollers 291 of the second guide roller pair 29 are elastic rollers. As an example, the first guide rollers 281 and the second guide rollers 291 are made of urethane. In a case where the first driving wheel 22 and the second driving wheel 23 are driven, the traveling vehicle 20 is guided in a direction along the traveling guide rail 3 by the first guide roller pair 28 and the second guide roller pair 29. Thus, the stacker crane 1A travels in the traveling direction D1.

As illustrated in FIG. 3, a plurality of distance sensors 80 are attached to the first side frame 211 of the traveling vehicle 20. The distance sensors 80 are sensors that detect a horizontal distance between the first side frame 211 and the traveling guide rail 3. More specifically, the distance sensors 80 detect a horizontal distance between a front surface of the first side frame 211 and the rear side surface of the traveling guide rail 3. In the present embodiment, the distance sensors 80 detect a distance in the front-rear direction between the first side frame 211 and the traveling guide rail 3. Examples of the distance sensors 80 include infrared sensors.

In the following description, the distance sensor 80 illustrated in the left-hand part of the drawing (the distance sensor 80 on the home position HP1 side) is referred to as a first distance sensor 80A, and the distance sensor 80 illustrated in the right-hand part of the drawing (the distance sensor 80 on the transport position CP1 side) is referred to as a second distance sensor 80B.

As illustrated in FIG. 4, the first distance sensor 80A and the second distance sensor 80B are located between the first driving wheel 22 and the second driving wheel 23 in the right-left direction. More specifically, the first distance sensor 80A and the second distance sensor 80B are located between the first guide roller pair 28 and the second guide roller pair 29 in the right-left direction. Note that the first distance sensor 80A may be located between the first driving wheel 22 and the first guide roller pair 28 in the right-left direction. Further, the second distance sensor 80B may be located between the second driving wheel 23 and the second guide roller pair 29 in the right-left direction.

The first distance sensor 80A is disposed so as to be spaced apart from the second distance sensor 80B in the right-left direction. The first distance sensor 80A is located on the left side in the right-left direction, and the second distance sensor 80B is located on the right side in the right-left direction. That is, the first distance sensor 80A is located closer to the first driving wheel 22 than the second distance sensor 80B in the right-left direction. Further, the first distance sensor 80A is located closer to the first driving wheel 22 than the second guide roller pair 29 in the right-left direction. The first distance sensor 80A and the second distance sensor 80B are attached to the vehicle frame 21 on opposite sides in the right-left direction when viewed from the central position CL in the right-left direction. The first distance sensor 80A is on the left when viewed from the central position CL in the right-left direction of the first side frame 211, and the second distance sensor 80B is on the right when viewed from the central position CL in the right-left direction of the first side frame 211.

The first distance sensor 80A is attached to a position closer to the first driving wheel 22 than the second distance sensor 80B. The first distance sensor 80A is disposed near the first guide roller pair 28. Specifically, a distance L1 in the right-left direction between the first distance sensor 80A and the first guide roller pair 28 is shorter than a distance L2 in the right-left direction between the first distance sensor 80A and the first driving wheel 22. More specifically, the distance L1 is a distance in the right-left direction between the first distance sensor 80A and a center of a rotation axis of the first guide rollers 281 of the first guide roller pair 28. Further, the distance L2 is a distance in the right-left direction between the first distance sensor 80A and a center of a rotation axis of the first driving wheel 22.

The second distance sensor 80B is disposed near the second guide roller pair 29. Specifically, a distance L3 in the right-left direction between the second distance sensor 80B and the second guide roller pair 29 is shorter than a distance L4 in the right-left direction between the second distance sensor 80B and the second driving wheel 23. More specifically, the distance L3 is a distance in the right-left direction between the second distance sensor 80B and a center of a rotation axis of the rear second guide rollers 291 of the second guide roller pair 29. The distance L4 is a distance in the right-left direction between the second distance sensor 80B and a center of a rotation axis of the second driving wheel 23.

As illustrated in FIGS. 3 and 4, a bar code reader 81 is attached to the second side frame 212 of the traveling vehicle 20. The bar code reader 81 is a device that reads a bar code 83 provided on a front side surface of the traveling rail 4. The bar code reader 81 is an example of a first reader. The bar code reader 81 is disposed between the traveling guide rail 3 and the traveling rail 4 in top view. That is, the bar code reader 81 is attached to the traveling vehicle 20 so as to be located between the traveling guide rail 3 and the traveling rail 4 in the front-rear direction. The bar code reader 81 faces the front side surface of the traveling rail 4.

Figure 7:
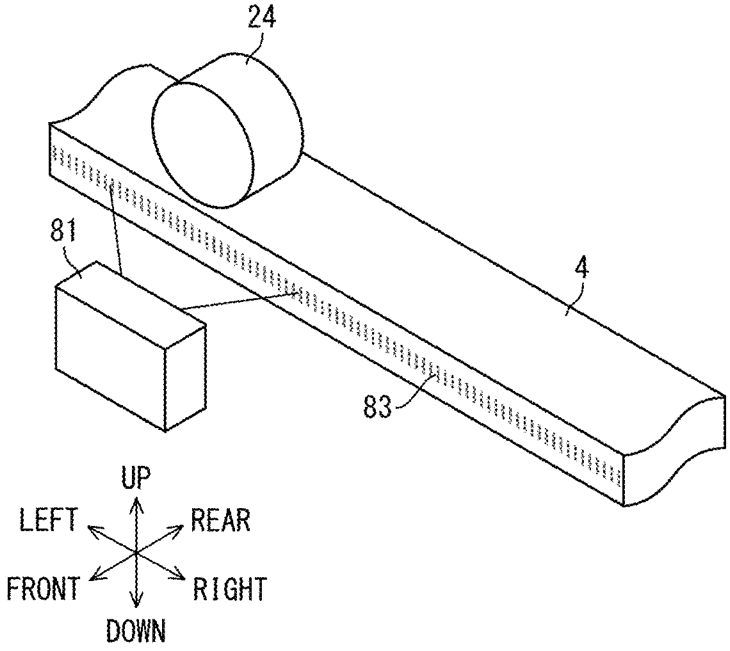
FIG. 7 is a view schematically describing a bar code reader and a bar code provided on a side surface of a traveling rail.

The bar code reader 81 and the bar code 83 are described here with reference to FIG. 7. FIG. 7 is a view schematically describing the bar code reader 81 and the bar code 83 provided on the side surface of the traveling rail 4. As illustrated in FIG. 7, the bar code 83 is provided on the side surface of the traveling rail 4. The bar code 83 is an example of an identifier. More specifically, the bar code 83 is provided on the front side surface of the traveling rail 4. The bar code 83 includes position information that is information pertaining to a position in the longitudinal direction of the traveling rail 4. The position information included in the bar code 83 is information corresponding to a position of the stacker crane 1A in the traveling direction. The stacker crane 1A moves to the home position HP1 or the transport position CP1 on the basis of the position information read from the bar code 83 of the traveling rail 4.

According to the above configuration, the bar code 83 is provided on a side surface of the traveling rail 4 on which side surface the first driven wheel 24 and the second driven wheel 25 do not roll. This reduces (i) the possibility that the bar code 83 may be worn due to rolling of the first driven wheel 24 and the second driven wheel 25 or (ii) the possibility that roller dust, etc. generated from the first driving wheel 22, the second driving wheel 23, the first guide rollers 281, the second guide rollers 291, the first driven wheel 24, and the second driven wheel 25 may be deposited on the bar code 83. This makes it possible to reduce a risk of a deterioration in detection performance of the bar code 83. Further, the bar code 83 is provided on the traveling rail 4 that is installed on the floor. That is, the bar code 83 is provided in a part near the floor. This makes it possible to easily carry out a maintenance operation with respect to the bar code reader 81 and the bar code 83.

As illustrated in FIG. 4, an emergency stop sensor 82 is attached to the first side frame 211. The emergency stop sensor 82 is a sensor for stopping traveling of the stacker crane 1A in a case where the stacker crane 1A travels beyond the home position HP1 or the transport position CP1 at which the stacker crane 1A is scheduled to stop.

A cable 90 is a cable that supplies motive power to the stacker crane 1A. The cable 90 makes it possible to supply electric power to each drive section of the stacker crane 1A. The cable 90 is held by a Cableveyor (registered trademark) and is driven by traveling of the stacker crane 1A. In a direction orthogonal to the traveling direction D1 in top view, the cable 90 is connected to the traveling vehicle 20 from a rear-side region that is among two regions obtained by partitioning with the traveling rail 4 serving as a center and that is opposite from a front-side region in which the traveling guide rail 3 is located. That is, in the front-rear direction, the cable 90 is connected to the traveling vehicle 20 from behind the traveling rail 4 with the traveling rail 4 at the center between the front-side and rear-side regions.

According to the above configuration, even in a case where the cable 90 is provided, the cable 90 and the bar code reader 81 are not in contact with each other. This prevents the bar code reader 81 from being tilted with respect to the traveling rail 4 by contact between the cable 90 and the bar code reader 81. With this, the bar code reader 81 can read the bar code 83 of the traveling rail 4 even in a case where the traveling vehicle 20 moves. Further, since the bar code reader 81 is located between the traveling guide rail 3 and the traveling rail 4 in top view, the traveling vehicle 20 can be made compact.

Raising and Lowering Platform

Figure 5:
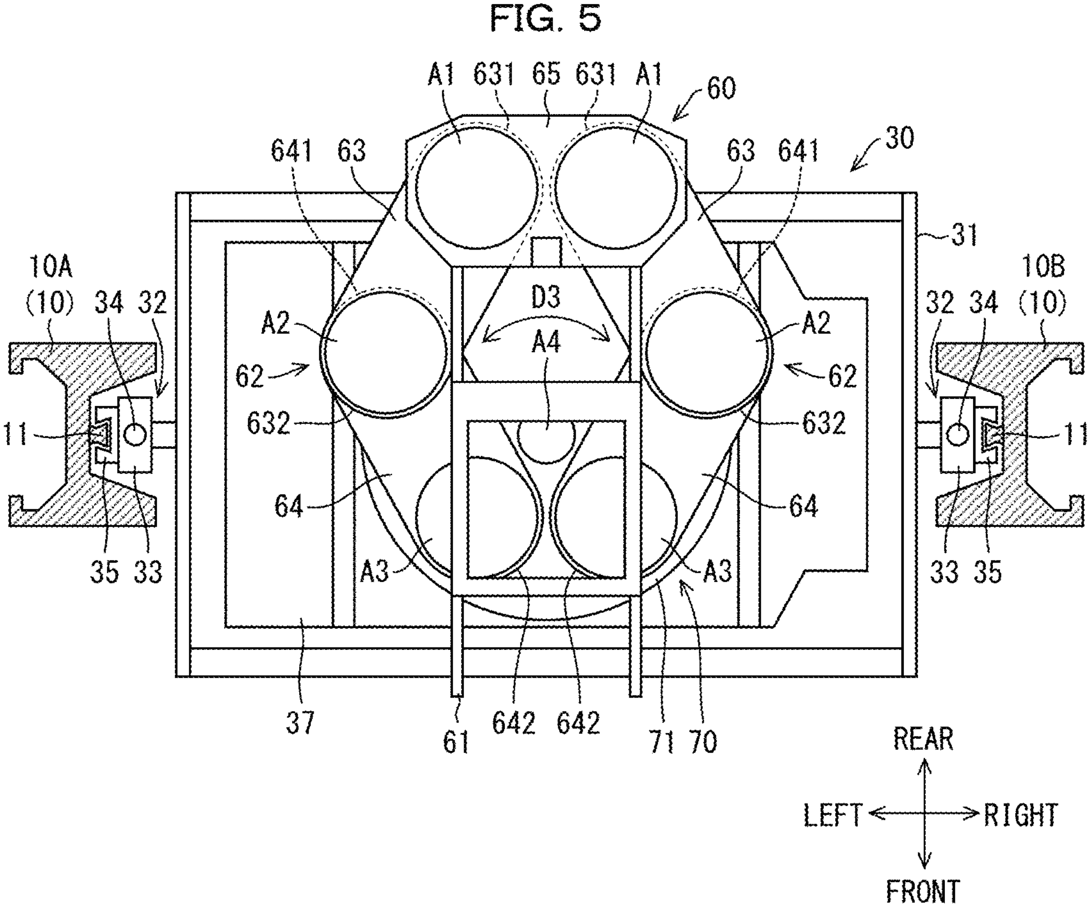
FIG. 5 is a plan view of a raising and lowering platform of the stacker crane illustrated in FIG. 2, as viewed from above.
Figure 6:
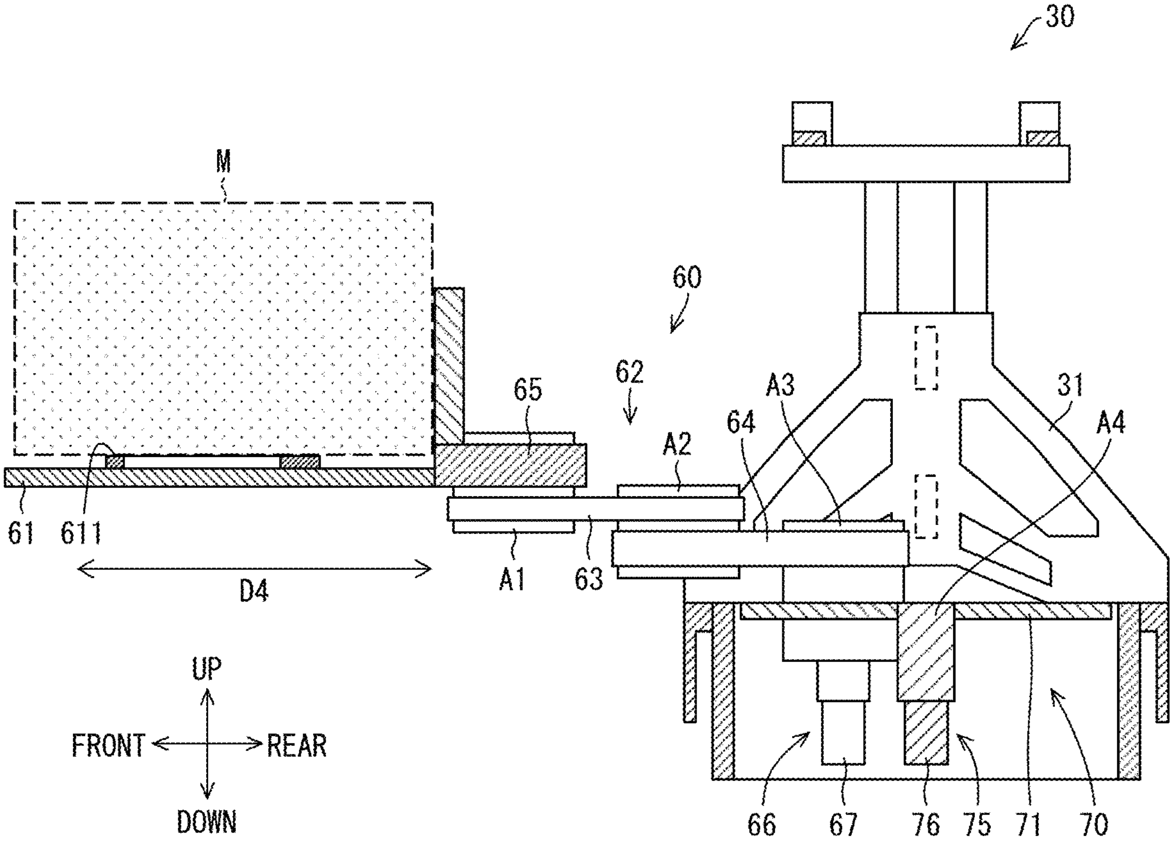
FIG. 6 is a cross-sectional view of the raising and lowering platform of the stacker crane illustrated in FIG. 2, as viewed from the right side.

A detailed configuration of the raising and lowering platform 30 will be described with reference to FIGS. 5 and 6. FIG. 5 is a plan view of the raising and lowering platform 30 of the stacker crane 1A illustrated in FIG. 2, as viewed from above. FIG. 6 is a cross-sectional view of the raising and lowering platform 30 of the stacker crane 1A illustrated in FIG. 2, as viewed from the right side.

The raising and lowering platform 30 allows an article M to be placed thereon (see FIG. 6) and is provided so as to be capable of being raised and lowered with respect to the masts 10. As illustrated in FIG. 5, the raising and lowering platform 30 includes a raising and lowering platform frame 31, a fork section 60, a turning section 70, and a cable box 37. The fork section 60 and the turning section 70 are mounted on the raising and lowering platform frame 31.

The raising and lowering platform frame 31 is provided with guide sections 32 that guide the raising and lowering platform 30 in the raising and lowering direction D2 in accordance with advance or retraction of the raising and lowering belts. The guide sections 32 have respective fixing parts 33 and respective guide shoes 35. One end of a corresponding one of the raising and lowering belts that are inserted through respective openings 34 which are formed in the respective fixing parts 33 is fixed to each of the fixing parts 33. Advance or retraction of the raising and lowering belts causes the fixing parts 33 to be pulled upward or lowered downward. The guide shoes 35 are engaged with the respective raising and lowering guide rails 11 of the masts 10 and slide with respect to the respective raising and lowering guide rails 11.

The fork section 60 loads or unloads the article M between the load shelf 2 and the raising and lowering platform 30. The fork section 60 is provided on a turning frame 71 of the turning section 70 (described later). The fork section 60 has a fork 61, arm sections 62, a gear box 65, and at least one fork motor unit 66. The fork 61 has a placement surface 611 (see FIG. 6) on which the article M can be placed. An upper surface of the fork 61 is the placement surface 611. The fork 61 is attached to the gear box 65.

The arm sections 62 are a pair of arm sections provided on the right and left. The fork 61 moves in an advance and retraction direction D4 (see FIG. 6) with respect to the raising and lowering platform 30 in accordance with movement of the arm sections 62 in the front-rear direction. The arm sections 62 have respective first arms 63 and respective second arms 64. On a first end 631 side in the longitudinal direction of a first arm 63, the first arm 63 is connected to the fork 61 via the gear box 65. The first arm 63 rotates about a rotation shaft A1 with respect to the gear box 65.

On a second end 632 side in the longitudinal direction of the first arm 63, the first arm 63 is connected to a second arm 64. In other words, the first arm 63 is provided on the first end 641 side in the longitudinal direction of the second arm 64. The first arm 63 rotates about a rotation shaft A2 with respect to the second arm 64.

On a second end 642 side in the longitudinal direction of the second arm 64, the second arm 64 is connected to a fork motor 67 (see FIG. 6) that the fork motor unit 66 has. The fork motor unit 66 is a driving section for moving the fork 61 in the advance and retraction direction D4. In a case where a driving force is transmitted from the fork motor 67, the second arm 64 rotates about a rotation shaft A3 with respect to the raising and lowering platform 30.

The at least one fork motor unit 66 comprises a plurality of fork motor units 66. The fork motor units 66 have respective fork motors 67 and respective encoders (not illustrated). In a case where the fork motors 67 rotate forward or backward, a pair of the second arms 64 rotate about respective rotation shafts A3. In a case where the second arms 64 rotate about the respective rotation shafts A3, first ends 641 of the respective second arms 64 move in a front or rear direction. A pair of the first arms 63 are each moved in the front-rear direction in accordance with movement of the first ends 641 of the respective second arms 64 in the front-rear direction. In this case, second ends 632 of the respective first arms 63 rotate with respect to the respective second arms 64, and first ends 631 of the respective first arms 63 rotate with respect to the gear box 65. The fork 61 is moved in the front-rear direction together with the gear box 65 in accordance with movement of the first ends 631 of the respective first arms 63 in the front-rear direction. In the present embodiment, the advance and retraction direction D4 of the fork 61 of the fork section 60 is the front-rear direction.

The turning section 70 turns the fork section 60 by rotating with respect to the raising and lowering platform 30. The turning section 70 has a turning frame 71 and a turning motor unit 75.

The turning frame 71 is a disk-shaped member and is provided with the fork section 60. As illustrated in FIG. 6, the turning frame 71 is connected to a rotation shaft A4 of a turning motor 76 of the turning motor unit 75. The turning motor unit 75 is a driving section that rotates the turning frame 71. The turning motor unit 75 has the turning motor 76 and an encoder (not illustrated). In a case where a driving force is applied to the turning frame 71 from the turning motor 76, the turning frame 71 rotates about the rotation shaft A4. In a case where the turning frame 71 rotates with respect to the raising and lowering platform 30, the fork section 60 turns in a turning direction D3 with respect to the raising and lowering platform 30.

A position of the fork section 60 (see FIG. 5) is a position that allows the article M to be loaded or unloaded on or from the load shelf 2 which is located in front of the stacker crane 1A. In a case where the turning frame 71 of the turning section 70 rotates 180 degrees from a position illustrated in FIG. 5, the fork section 60 turns with rotation of the turning frame 71. In a case where the fork section 60 turns 180 degrees from the position illustrated in FIG. 5, the fork section 60 allows the article M to be loaded or unloaded on or from the rear load shelf 2 which is located behind the stacker crane 1A.

The cable box 37 is a box in which cables for connecting (i) various devices mounted on the raising and lowering platform 30, such as a sensor(s), and (ii) a device(s) disposed outside the raising and lowering platform 30 are aggregated. The cable box 37 is disposed on the left side (home position HP1 side) with respect to the raising and lowering platform 30. Cables for communicating signals to the fork motor units 66 and the turning motor unit 75 each mounted on the raising and lowering platform 30 are aggregated in the cable box 37. The cable box 37 is provided with a connector plate in which a connector to which a raising and lowering cable is connected is installed. The connector of the cable box 37 is connected by the raising and lowering cable to a connector that is installed in a connector plate of the driver box 45.

Control Box

The control box 40 is attached to the first mast 10A. The control box 40 is attached to a rear side of the first mast 10A in the front-rear direction. The control box 40 is a housing that houses a control device 41 which carries out electronic control of the stacker crane 1A as a whole.

Figure 8:
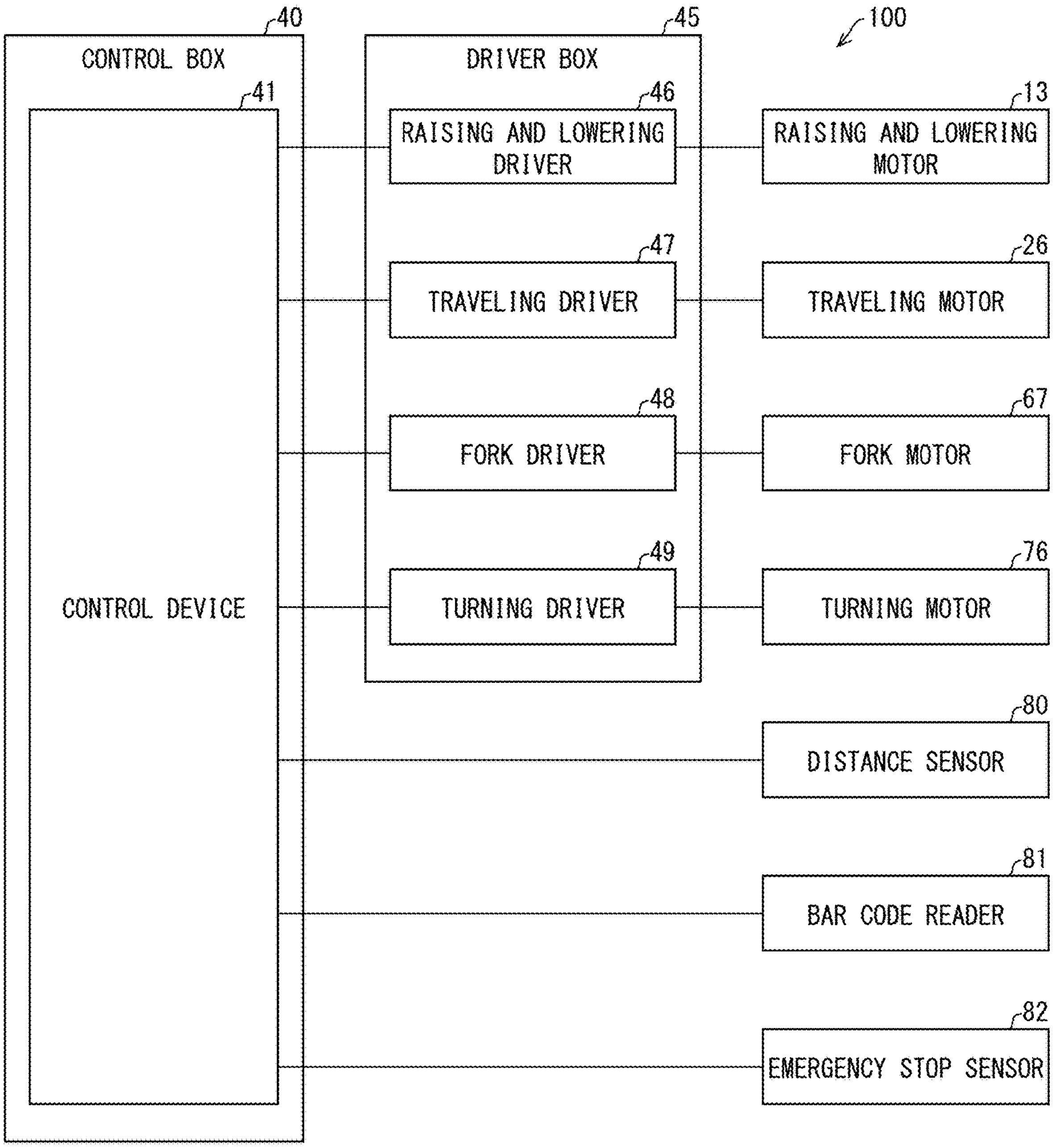
FIG. 8 is a block diagram illustrating an electrical configuration of the stacker crane illustrated in FIG. 2.

An electrical configuration of the stacker crane 1A will be described with reference to FIG. 8. FIG. 8 is a block diagram illustrating the electrical configuration of the stacker crane 1A illustrated in FIG. 2. As illustrated in FIG. 8, the control device 41 is constituted by a computer that includes a processor such as a central processing unit (CPU), a memory such as a RAM or a ROM, and a communication interface. The processor of the control device 41 carries out various types of control and various operations by executing various programs stored in the memory. The processor of the control device 41 mainly carries out control of traveling of the stacker crane 1A, control of raising and lowering of the raising and lowering platform 30, control of advance or retraction of the fork section 60, and control of turning of the turning section 70.

The control device 41 is connected to a raising and lowering driver 46, a traveling driver 47, a fork driver 48, and a turning driver 49 so that information communication can be carried out. The raising and lowering driver 46 carries out control of motive power supplied to the raising and lowering motors 13. The traveling driver 47 carries out control of motive power supplied to the traveling motors 26. The fork driver 48 carries out control of motive power supplied to the fork motors 67. The turning driver 49 carries out control of motive power supplied to the turning motor 76.

The control device 41 controls each of the drivers 46 to 49. Specifically, the control device 41 transmits a command signal to each of the drivers 46 to 49 and controls operation of each of the drivers 46 to 49. More specifically, the control device 41 transmits a position command to each of the drivers 46 to 49. On the basis of the command signal from the control device 41, each of the drivers 46 to 49 outputs electric power to be supplied to a corresponding one of the motors 13, 26, 67, and 76.

Further, the control device 41 is electrically connected to the distance sensors 80, the bar code reader 81, and the emergency stop sensor 82. The control device 41 calculates a distance between the traveling guide rail 3 and the traveling vehicle 20 on the basis of signals acquired from the distance sensors 80. The control device 41 acquires position information read by the bar code reader 81, and controls the traveling driver 47 on the basis of the acquired position information. The control device 41 controls the traveling driver 47 on the basis of a signal acquired from the emergency stop sensor 82.

Driver Box

As illustrated in FIG. 2, the driver box 45 is attached to the first mast 10A. The driver box 45 is attached to a front side of the first mast 10A in the front-rear direction. The driver box 45 houses the raising and lowering driver 46, the traveling driver 47, the fork driver 48, and the turning driver 49. The drivers 46 to 49 are aggregated in one driver box 45. The fork driver 48 and the turning driver 49 are disposed outside the raising and lowering platform 30. The fork driver 48 and the turning driver 49 are connected to the cable box 37 of the raising and lowering platform 30 by a raising and lowering cable (not illustrated).

As illustrated in FIG. 8, the raising and lowering driver 46 is electrically connected to the raising and lowering motors 13. The raising and lowering driver 46 controls, on the basis of the command signal from the control device 41, an amount of electric current supplied to the raising and lowering motors 13. The raising and lowering driver 46 controls, on the basis of information fed back from an encoder (not illustrated) (an external encoder or a raising and lowering motor encoder), the amount of the electric current supplied to the raising and lowering motors 13. The raising and lowering driver 46 includes a driving circuit that supplies electric current to the raising and lowering motors 13.

The traveling driver 47 is electrically connected to the traveling motors 26. The traveling driver 47 controls, on the basis of the command signal from the control device 41, an amount of electric current supplied to the traveling motors 26. The traveling driver 47 controls, on the basis of information fed back from an encoder (not illustrated) (an external encoder or a traveling motor encoder), the amount of the electric current supplied to the traveling motors 26. The traveling driver 47 includes a driving circuit that supplies electric current to the traveling motors 26.

The fork driver 48 is electrically connected to the respective fork motors 67 of the fork motor units 66. The fork driver 48 controls, on the basis of the command signal from the control device 41, an amount of electric current supplied to the fork motors 67. The fork driver 48 controls, on the basis of information fed back from an encoder (not illustrated) that each of the fork motor unit 66 has, the amount of the electric current supplied to the fork motors 67. The fork driver 48 includes a driving circuit that supplies electric current to the fork motors 67.

The turning driver 49 is electrically connected to the turning motor 76 of the turning motor unit 75. The turning driver 49 controls, on the basis of the command signal from the control device 41, an amount of electric current supplied to the turning motor 76. Further, the turning driver 49 controls, on the basis of information fed back from an encoder (not illustrated) that the turning motor unit 75 has, the amount of the electric current supplied to the turning motor 76. The turning driver 49 includes a driving circuit that supplies electric current to the turning motor 76.

Note that, in the article transport facility 100, a configuration of the stacker crane 1B is similar to that of the stacker crane 1A, except for a part of the configuration. The following will describe the part of the configuration of the stacker crane 1B which part is different from the configuration of the stacker crane 1A. In the following description, wheels of the traveling vehicle 20 of the stacker crane 1B are referred to as a first driving wheel 1B22, a second driving wheel 1B23, a first driven wheel 1B24, and a second driven wheel 1B25, respectively. Further, a first side frame among frames constituting the vehicle frame 21 of the stacker crane 1B is referred to as a first side frame 1B211, and a second side frame among the frames constituting the vehicle frame 21 is referred to as a second side frame 1B212. Configurations of the wheels 1B22 to 1B25 of the stacker crane 1B, and the first side frame 1B211 and the second side frame 1B212 of the vehicle frame 21 are different from the configurations of the wheels 22 to 25 of the stacker crane 1A, and the first side frame 211 and the second side frame 212 of the vehicle frame 21.

A rail on which the first driving wheel 1B22 and the second driving wheel 1B23 of the traveling vehicle 20 of the stacker crane 1B roll is different from a rail on which the first driving wheel 22 and the second driving wheel 23 of the traveling vehicle 20 of the stacker crane 1A roll. That is, the first driving wheel 22 and the second driving wheel 23 of the stacker crane 1A roll on an upper surface of the traveling guide rail 3, and the first driving wheel 1B22 and the second driving wheel 1B23 of the stacker crane 1B roll on an upper surface of the traveling rail 4.

The first driving wheel 1B22 and the second driving wheel 1B23 are attached to the second side frame 1B212 of the traveling vehicle 20. The traveling vehicle 20 of the stacker crane 1B is an example of a second traveling vehicle, and the first driving wheel 1B22 and the second driving wheel 1B23 are examples of a second wheel. Further, the first driven wheel 1B24 and the second driven wheel 1B25 of the stacker crane 1B are attached to the first side frame 1B211. The first driven wheel 1B24 and the second driven wheel 1B25 are examples of a fourth roller. The length in the right-left direction of the second side frame 1B212 to which the driving wheels are attached is longer than the length in the right-left direction of the first side frame 1B211 to which the driven wheels are attached.

The first guide roller pair 28 and the second guide roller pair 29 of the stacker crane 1B are attached to the first side frame 1B211 as in the case of the first guide roller pair 28 and the second guide roller pair 29 of the stacker crane 1A. A first guide roller 281 and a second guide roller 291 of the stacker crane 1B are examples of a third roller. Further, as in the case of the bar code reader 81 of the stacker crane 1A, the bar code reader 81 of the stacker crane 1B is attached to the second side frame 1B212. The bar code reader 81 of the stacker crane 1B is an example of a second reader.

Note that, as in the case of the stacker crane 1A, in the front-rear direction, the cable 90 of the stacker crane 1B is connected to the traveling vehicle 20 of the stacker crane 1B from behind the traveling rail 4 with the traveling rail 4 at the center between the front-side and rear-side regions. Note, however, that the present invention is not limited to such a configuration. In the front-rear direction, the cable 90 of the stacker crane 1B may be connected to the traveling vehicle 20 of the stacker crane 1B from the front of the traveling guide rail 3 with the traveling guide rail 3 at the center between the front-side and rear-side regions.

According to the above configuration, the first guide rollers 281 and the second guide rollers 291 of the traveling vehicle 20 of the stacker crane 1B roll on a side surface of the traveling guide rail 3. This prevents the bar code 83 of the traveling rail 4 from being worn by the first guide rollers 281 and the second guide rollers 291 of the stacker crane 1B. This makes it possible to reduce a risk of a deterioration in detection performance of the bar code 83. Further, a configuration in which the first guide rollers 281 and the second guide rollers 291 of the stacker crane 1B roll on the side surface of the traveling guide rail 3 prevents the first guide rollers 281 and the second guide rollers 291 of the stacker crane 1B and the cable 90 connected to the traveling vehicle 20 of the stacker crane 1A from being brought into contact with each other during traveling of the traveling vehicle 20 of the stacker crane 1B. This allows the traveling vehicle 20 of the stacker crane 1B to smoothly travel on the traveling guide rail 3 and the traveling rail 4.

Sensing by Control Device

The control device 41 senses, on the basis of a horizontal distance detected by the first distance sensor 80A, that the first guide rollers 281 of the first guide roller pair 28 have been worn. Further, the control device 41 senses, on the basis of a horizontal distance detected by the second distance sensor 80B, that the second guide rollers 291 of the second guide roller pair 29 have been worn.

A case where the first guide rollers 281 of the first guide roller pair 28 have been worn will be used as an example to describe sensing of wear of the guide rollers by the control device 41. Note that sensing of wear of the second guide rollers 291 of the second guide roller pair 29 by the control device 41 is carried out as in the case of sensing of wear of the first guide rollers 281 of the first guide roller pair 28 by the control device 41.

Wear of one of the pair of first guide rollers 281 causes the traveling vehicle 20 to be highly unstable in the front-rear direction with respect to the traveling guide rail 3. That is, a distance between the first side frame 211 and the traveling guide rail 3 is greatly changed. For example, in a case where the front first guide roller 281 has been worn, a distance detected by the first distance sensor 80A between the first side frame 211 and the traveling guide rail 3 may be increased. In a case where the rear first guide roller 281 has been worn, the distance detected by the first distance sensor 80A between the first side frame 211 and the traveling guide rail 3 may be decreased. The control device 41 senses, from a change in horizontal distance detected by the first distance sensor 80A, that one of the pair of the first guide rollers 281 has been worn.

The control device 41 senses a tilt of the traveling vehicle 20 on the basis of the horizontal distance detected by the first distance sensor 80A and the horizontal distance detected by the second distance sensor 80B. Specifically, on the basis of the horizontal distance detected by the first distance sensor 80A and the horizontal distance detected by the second distance sensor 80B, the control device 41 senses a tilt of the traveling vehicle 20 in the front-rear direction with respect to the traveling guide rail 3 during stopping of traveling.

The first guide rollers 281 and the second guide rollers 291 are elastic members. Thus, the first guide rollers 281 and the second guide rollers 291 are strained by a load applied in the front-rear direction. In a case where the first guide rollers 281 and/or the second guide rollers 291 are strained, the traveling vehicle 20 is in a state of being tilted obliquely in the front-rear direction with respect to the traveling guide rail 3. When traveling of the stacker crane 1A is stopped, the traveling vehicle 20 may be in a state of being tilted obliquely in the front-rear direction with respect to the traveling guide rail 3. In a case where the traveling vehicle 20 is tilted in the front-rear direction with respect to the traveling guide rail 3, the raising and lowering platform 30 is also tilted obliquely in the front-rear direction with respect to the traveling guide rail 3 in accordance with the tilt of the traveling vehicle 20.

On the basis of the horizontal distance detected by the first distance sensor 80A and the horizontal distance detected by the second distance sensor 80B, the control device 41 calculates a tilt of the traveling vehicle 20 with respect to the traveling guide rail 3 and senses the tilt of the traveling vehicle 20. The control device 41 controls the turning section 70 in accordance with the sensed tilt of the traveling vehicle. Specifically, the control device 41 drives the turning motor 76 so as to rotate the turning frame 71 in a direction opposite from a direction of the tilt of the traveling vehicle 20 with respect to the traveling guide rail 3 in the front-rear direction.

Embodiment 2

The following will describe another embodiment of the present invention in detail with reference to FIGS. 9 to 12. Note that for convenience, members having functions identical to those of the respective members described in Embodiment 1 are given respective identical reference numerals, and a description of those members is omitted. An article transport facility 100A in accordance with Embodiment 2 differs from the article transport facility 100 in accordance with Embodiment 1 in that the article transport facility 100A includes a feed section for supplying motive power to a stacker crane 1C of the article transport facility 100A in a noncontact manner. Further, the stacker crane 1C in accordance with Embodiment 2 differs from the stacker crane 1 in accordance with Embodiment 1 in that the stacker crane 1C includes a power receiving section that receives electric power from the feed section.

Figure 9:
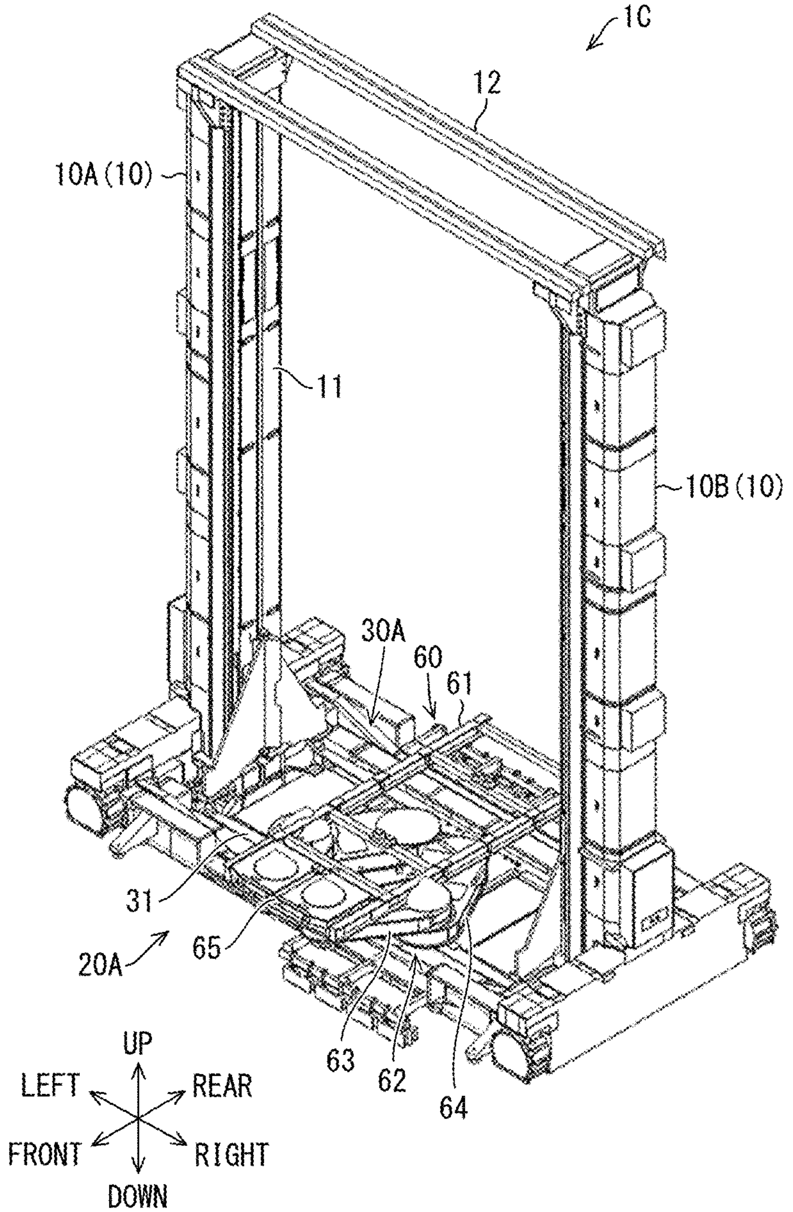
FIG. 9 is a view schematically illustrating a stacker crane of an article transport facility in accordance with Embodiment 2 of the present invention.
Figure 10:
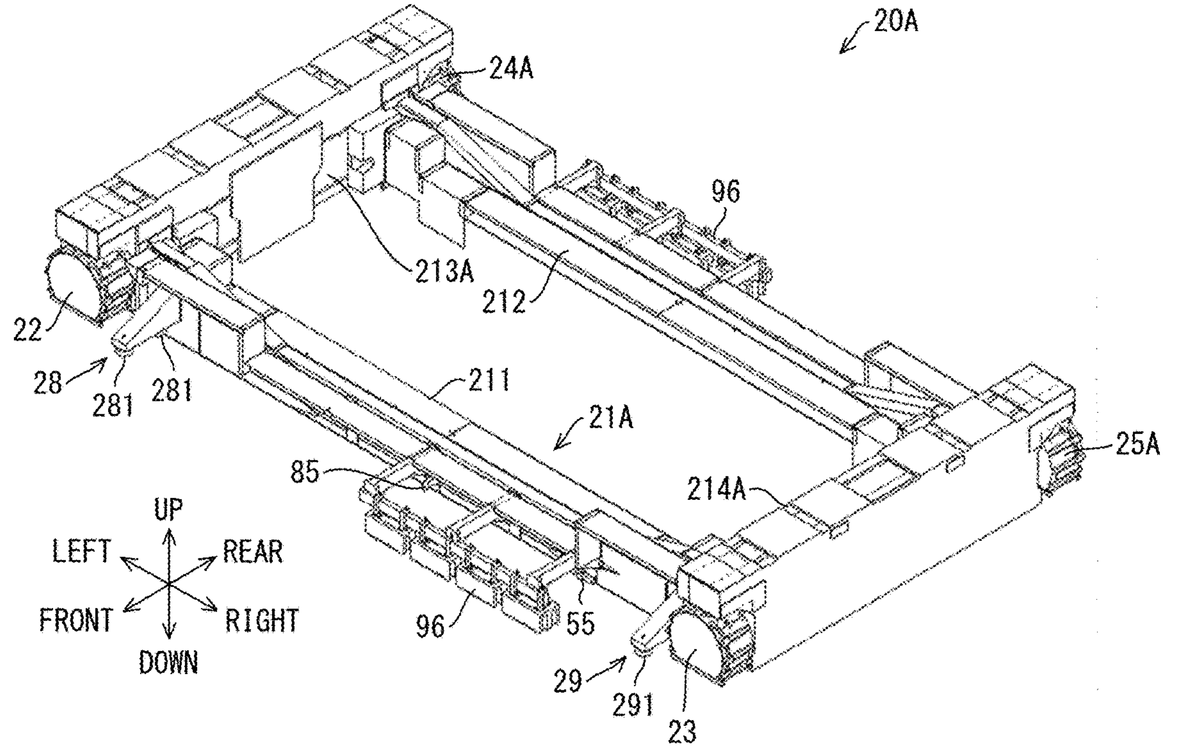
FIG. 10 is a perspective view of a traveling vehicle of the stacker crane illustrated in FIG. 9, as viewed from above.
Figure 11:
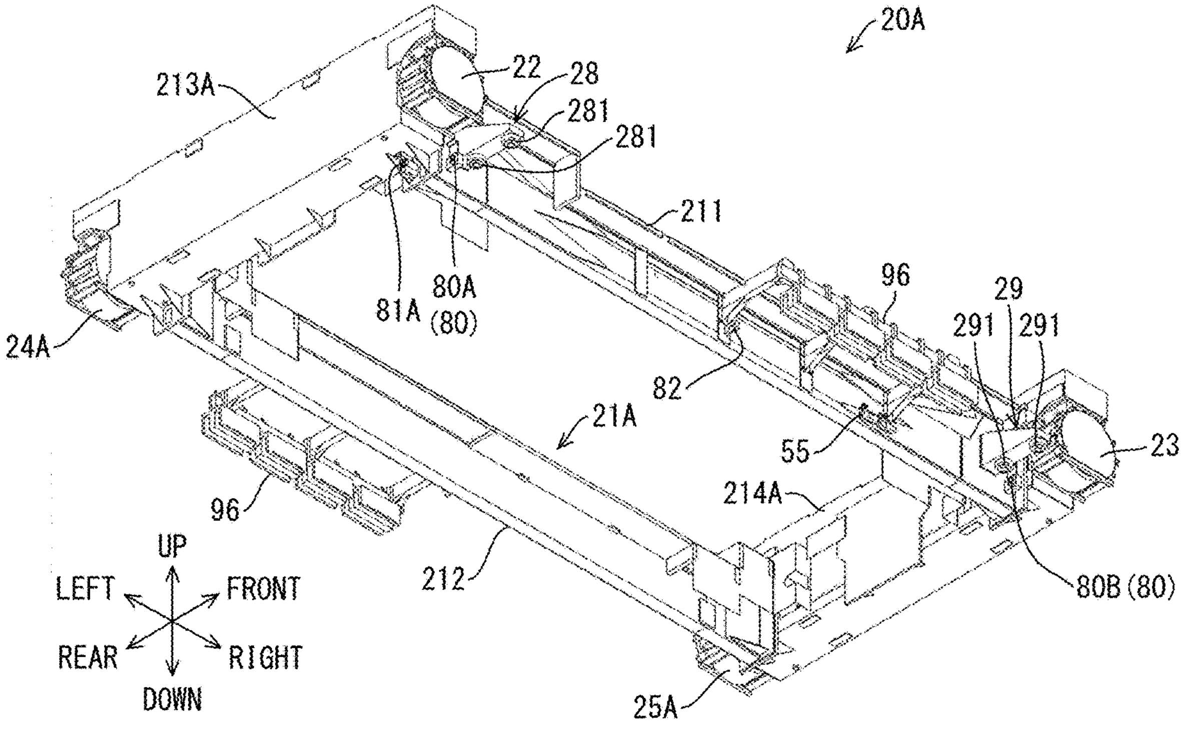
FIG. 11 is a perspective view of the traveling vehicle of the stacker crane illustrated in FIG. 9, as viewed from below.
Figure 12:
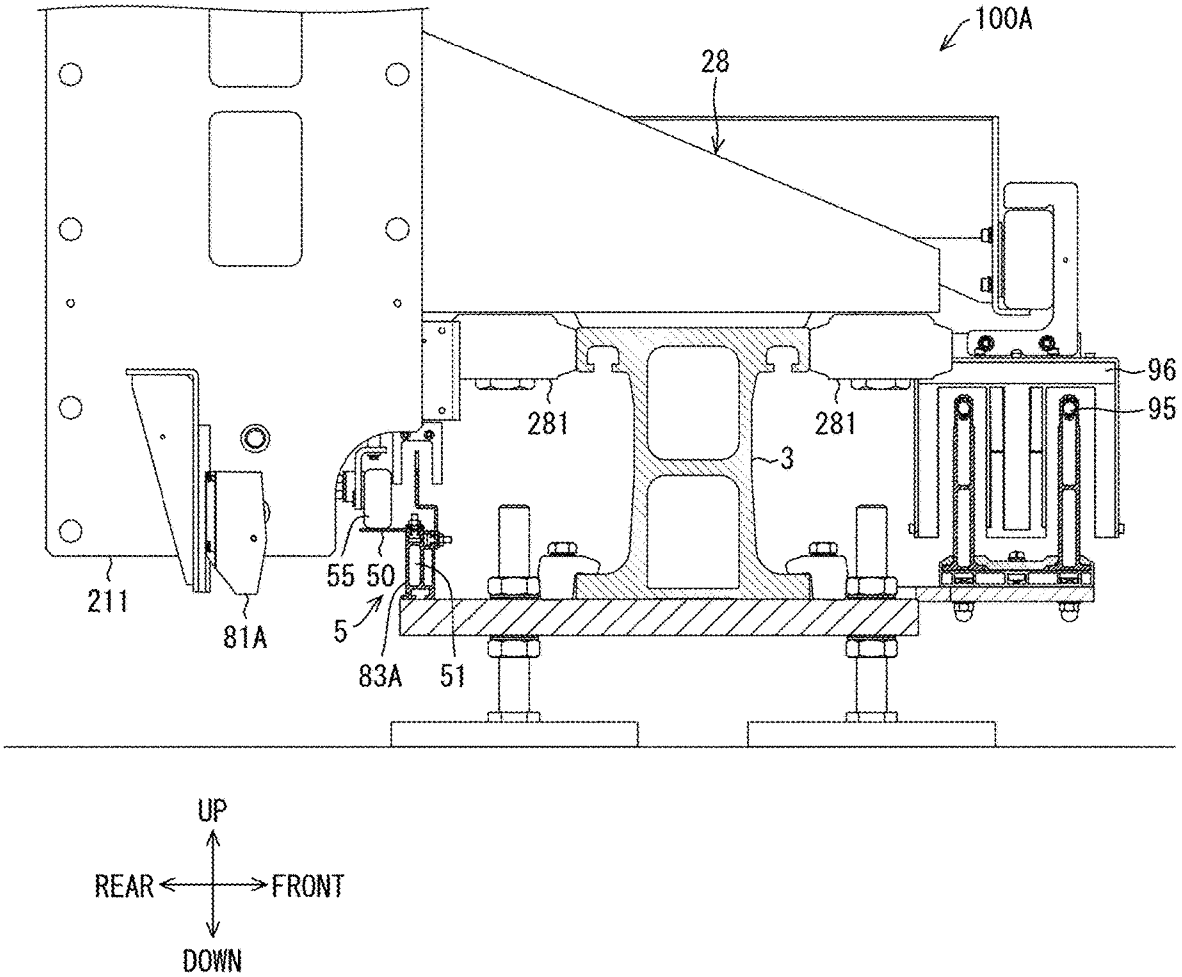
FIG. 12 is an enlarged view of a main part of the article transport facility in accordance with Embodiment 2.

FIG. 9 is a view schematically illustrating the stacker crane 1C of the article transport facility 100A in accordance with Embodiment 2 of the present invention. FIG. 10 is a perspective view of a traveling vehicle 20A of the stacker crane 1C illustrated in FIG. 9, as viewed from above. FIG. 11 is a perspective view of the traveling vehicle 20A of the stacker crane 1C illustrated in FIG. 9, as viewed from below. FIG. 12 is an enlarged view of a main part of the article transport facility 100A in accordance with Embodiment 2.

The article transport facility 100A includes a plurality of stacker cranes 1C. In the article transport facility 100A, two stacker cranes 1C travel on a single traveling guide rail 3 and a single traveling rail 4. As illustrated in FIG. 9, the stacker crane 1C of the article transport facility 100A includes a pair of masts 10, the traveling vehicle 20A, and a raising and lowering platform 30A. A fork section 60 is mounted on a raising and lowering platform frame 31 of the raising and lowering platform 30A.

As illustrated in FIGS. 10 and 11, the traveling vehicle 20A has four driving wheels. A first driving wheel 22 and a second driving wheel 23 are attached to a front of a vehicle frame 21A of the traveling vehicle 20A. More specifically, the first driving wheel 22 is attached to a front end portion of a first connection frame 213A, and the second driving wheel 23 is attached to a front end portion of a second connection frame 214A.

A third driving wheel 24A and a fourth driving wheel 25A are attached to a rear of the vehicle frame 21A. More specifically, the third driving wheel 24A is attached to a rear end portion of the first connection frame 213A, and the fourth driving wheel 25A is attached to a rear end portion of the second connection frame 214A. The third driving wheel 24A and the fourth driving wheel 25A roll on an upper surface of the traveling rail 4.

A ground roller 55, which is an electrically conductive roller, is attached to a first side frame 211 of the traveling vehicle 20A. In the present embodiment, the ground roller 55 is an example of a second roller. The ground roller 55 rolls on an upper surface of a ground rail 5 (described later). The ground roller 55 is a roller that has a function as a ground and that is additionally installed separately from a wheel of the traveling vehicle 20A. Further, as illustrated in FIG. 11, a bar code reader 81A is attached to a left end portion of the first side frame 211. Note that the bar code reader 81A may be attached to a right end portion of the first side frame 211, or may be attached to a central part of the first side frame 211 in a right-left direction.

A pickup coil 96 is attached to the first side frame 211. The pickup coil 96 is an example of a power receiving section. The pickup coil 96 is disposed at a distance from a guidepath wire 95 (described later) so as to face the guidepath wire 95.

As illustrated in FIG. 12, the article transport facility 100A includes the guidepath wire 95. The guidepath wire 95 is disposed in parallel with the traveling rail 4. The guidepath wire 95 is an example of a feed section. To the guidepath wire 95, electric power is supplied from a power panel (not illustrated). Supply of electric power to the guidepath wire 95 results in generation of a magnetic field in the guidepath wire 95. The pickup coil 96 of the traveling vehicle 20A receives electric power from a magnetic field generated from the guidepath wire 95.

Further, the article transport facility 100A further includes the ground rail 5 that is a metallic rail. In the present embodiment, the ground rail 5 is an example of a second rail. The ground rail 5 is provided in parallel with the traveling guide rail 3. The traveling guide rail 3 is located between the guidepath wire 95 and the ground rail 5 in a direction orthogonal to a traveling direction along the traveling guide rail 3 in top view. That is, the traveling guide rail 3 is located between the guidepath wire 95 and the ground rail 5 in a front-rear direction.

The ground rail 5 has a ceiling wall 50 and a side wall 51. The ceiling wall 50 has an upper surface on which the ground roller 55 rolls. The side wall 51 extends downward from the traveling guide rail 3 side of the ceiling wall 50 in a direction orthogonal to a longitudinal direction of the ground rail 5 in top view. That is, the side wall 51 extends downward from a front end portion of the ceiling wall 50 in the front-rear direction.

A bar code 83A is provided on the side wall 51 of the ground rail 5. More specifically, a surface of the side wall 51 on which surface the bar code 83A is provided is a surface that is located on an opposite side from a surface of the side wall 51 which surface faces the traveling guide rail 3. That is, the bar code 83A is provided on a surface of the side wall 51 which surface faces rearward. The bar code 83A includes position information that is information pertaining to a position in the longitudinal direction of the ground rail 5. The bar code reader 81A is attached to the first side frame 211 so as to face the surface of the side wall 51 on which surface the bar code 83A is provided and which surface faces rearward.

According to the above configuration, the ceiling wall 50 is located above a side surface of the side wall 51 on which side surface the bar code 83A is provided. Dust falling from above is deposited on the ceiling wall 50. This makes it difficult for the dust to adhere to the bar code 83A of the side wall 51. This makes it possible to reduce a risk of a deterioration in detection performance of the bar code 83A.

Further, according to the above configuration, the bar code 83A is provided on the ground rail 5 on which the ground roller 55 that has a function as a ground rolls. It is therefore unnecessary to separately provide a member on which the bar code 83A is to be provided. This makes it possible to reduce the number of components.

Furthermore, according to the above configuration, the ground rail 5 is located at a position away from the guidepath wire 95. This allows the ground rail 5 to be outside a range of a magnetic field generated from the guidepath wire 95. This makes it possible to prevent a temperature increase of the ground rail 5 due to a magnetic field from the guidepath wire 95.

Note that the plurality of stacker cranes 1C of the article transport facility 100A all have similar configurations. The traveling vehicle 20A of one stacker crane 1C among the plurality of stacker cranes 1C is an example of a first traveling vehicle. In the present embodiment, the traveling vehicle 20A of the other stacker crane 1C among the plurality of stacker cranes 1C is an example of a third traveling vehicle. In the present embodiment, the first driving wheel 22 and the second driving wheel 23 of the traveling vehicle 20A of the other stacker crane 1C among the plurality of stacker cranes 1C are examples of a third wheel. Further, in the present embodiment, a first guide roller 281 and a second guide roller 291 of the other stacker crane 1C among the plurality of stacker cranes 1C are examples of a third roller. Furthermore, in the present embodiment, the ground roller 55 of the other stacker crane 1C among the plurality of stacker cranes 1C is an example of a fifth roller. Moreover, the bar code reader 81A of the other stacker crane 1C among the plurality of stacker cranes 1C is an example of a third reader.

In the article transport facility 100A, the bar code reader 81A that the two stacker cranes 1C each include reads position information from the bar code 83A. That is, traveling of the two stacker cranes 1C is controlled by the control device 41 on the basis of the position information read from the identical bar code 83A of the ground rail 5. That is, on the basis of the position information of the bar code 83A, each of the stacker cranes 1C moves to a home position in the case of a standby state in which no article is transported and a transport position at which an article is loaded or unloaded.

According to the above configuration, even in a case where a plurality of traveling vehicles 20A travel on the traveling guide rail 3, it is unnecessary to provide the ground rail 5 with bar codes 83A whose number corresponds to the number of the traveling vehicles 20A. That is, the bar code reader 81A of the one stacker crane 1C and the bar code reader 81A of the other stacker crane 1C read the position information from the identical bar code 83A. This makes it possible to easily carry out position control of the traveling vehicle 20 of the one stacker crane 1C and the traveling vehicle 20 of the other stacker crane 1C.

Additional Remarks

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Stacker crane
3 Traveling guide rail
4 Traveling rail
10 Mast
20 Traveling vehicle
21 Vehicle frame
22 First driving wheel
23 Second driving wheel
28 First guide roller pair
29 Second guide roller pair
41 Control device
80 Distance sensor
81 Bar code reader
100 Article transport facility
281 First guide roller
291 Second guide roller

The invention claimed is:

1. An article transport facility comprising:
a first rail;
a second rail that is installed in parallel with the first rail; and
a first traveling vehicle that has a first wheel which rolls on an upper surface of the first rail, a first roller which rolls on a side surface of the first rail, and a second roller which rolls on an upper surface of the second rail,
an identifier being provided on a side surface of the second rail, the identifier including position information that is information pertaining to a position in a longitudinal direction of the second rail, and
the first traveling vehicle further having a first reader which reads the position information from the identifier, further comprising
a cable that supplies motive power to the first traveling vehicle,
in a direction orthogonal to a traveling direction along the first rail in top view, the cable being connected to the first traveling vehicle from a region that is among two regions obtained by partitioning with the second rail serving as a center and that is opposite from a region in which the first rail is located, and
the first reader being disposed between the first rail and the second rail in top view.

2. The article transport facility according to claim 1, further comprising
a second traveling vehicle that has a second wheel which rolls on the upper surface of the second rail and which is a driving wheel, a third roller which rolls on the side surface of the first rail, a fourth roller which rolls on the upper surface of the first rail, and a second reader which reads the position information from the identifier,
the first wheel of the first traveling vehicle being a driving wheel.

3. The article transport facility according to claim 1, wherein
the second rail has a ceiling wall that has an upper surface on which the second roller rolls and a side wall that extends downward from the first rail side of the ceiling wall in a direction orthogonal to a longitudinal direction of the second rail in top view and that has the side surface on which the identifier is provided, and
the side surface on which the identifier is provided is a surface of the side wall that faces away from the first rail.

4. An article transport facility comprising:
a first rail;
a second rail that is installed in parallel with the first rail; and
a first traveling vehicle that has a first wheel which rolls on an upper surface of the first rail, a first roller which rolls on a side surface of the first rail, and a second roller which rolls on an upper surface of the second rail,
an identifier being provided on a side surface of the second rail, the identifier including position information that is information pertaining to a position in a longitudinal direction of the second rail, and
the first traveling vehicle further having a first reader which reads the position information from the identifier, further comprising
a feed section that supplies motive power to the first traveling vehicle in a noncontact manner,
the second roller being an electrically conductive roller, and
the second rail being a metallic rail.

5. The article transport facility according to claim 4, wherein the first rail is located between the feed section and the second rail in a direction orthogonal to a traveling direction along the first rail in top view.

6. The article transport facility according to claim 5, further comprising
a third traveling vehicle that has a third wheel which rolls on the upper surface of the first rail, a third roller which rolls on the side surface of the first rail, and a fifth roller which rolls on the upper surface of the second rail,
the third traveling vehicle further having a third reader which reads the position information from the identifier.

7. A traveling vehicle comprising:
a wheel that rolls on an upper surface of a first rail;
a first roller that rolls on a side surface of the first rail;
a second roller that rolls on an upper surface of a second rail which is installed in parallel with the first rail;
a reader that reads, from an identifier which is provided on a side surface of the second rail, position information which is information pertaining to a position in a longitudinal direction of the second rail; and
a cable that supplies motive power to the first traveling vehicle, wherein
in a direction orthogonal to a traveling direction along the first rail in top view, the cable being connected to the traveling vehicle from a region that is among two regions obtained by partitioning with the second rail serving as a center and that is opposite from a region in which the first rail is located, and the reader being disposed between the first rail and the second rail in top view.

* * * * *